United States Patent

Bloom

[15] 3,682,503
[45] Aug. 8, 1972

[54] PIPE JOINT
[72] Inventor: Stanley Bloom, Whitehall, Pa.
[73] Assignee: Peerless Industries, Incorporated, Boyertown, Pa.
[22] Filed: Sept. 11, 1970
[21] Appl. No.: 71,581

[52] U.S. Cl. ................285/345, 285/369, 285/383
[51] Int. Cl. .............................................F16l 17/00
[58] Field of Search......285/364, 383, 345, 110, 235, 285/236

[56] References Cited

UNITED STATES PATENTS

| | | | |
|---|---|---|---|
| 3,479,066 | 11/1969 | Gittlemann | 285/236 |
| 3,334,928 | 8/1967 | Schmunk | 285/110 |
| 3,558,164 | 1/1971 | Havell | 185/236 |
| 3,430,989 | 3/1969 | Wendt | 285/383 X |
| 2,711,331 | 6/1955 | Temple | 285/236 X |

FOREIGN PATENTS OR APPLICATIONS

| | | | |
|---|---|---|---|
| 1,083,451 | 9/1967 | Great Britain | 285/110 |
| 83,546 | 12/1956 | Netherlands | 285/110 |

*Primary Examiner*—Dave W. Arola
*Attorney*—Emory L. Groff and Emory L. Groff, Jr.

[57] ABSTRACT

A double hubless compression joint for pipes includes a rigid outer retaining sleeve containing an interior resilient sleeve gasket provided with inwardly directed projections on its inner periphery. Prior to the assembly of a pair of end to end pipe sections, the inner diameter of the gasket projections is less than the outer diameter of the pipe sections whereby upon insertion of the pipe ends into the gasket bore, the projections are radially and outwardly displaced against the resistance of the rigid retaining sleeve.

1 Claim, 3 Drawing Figures

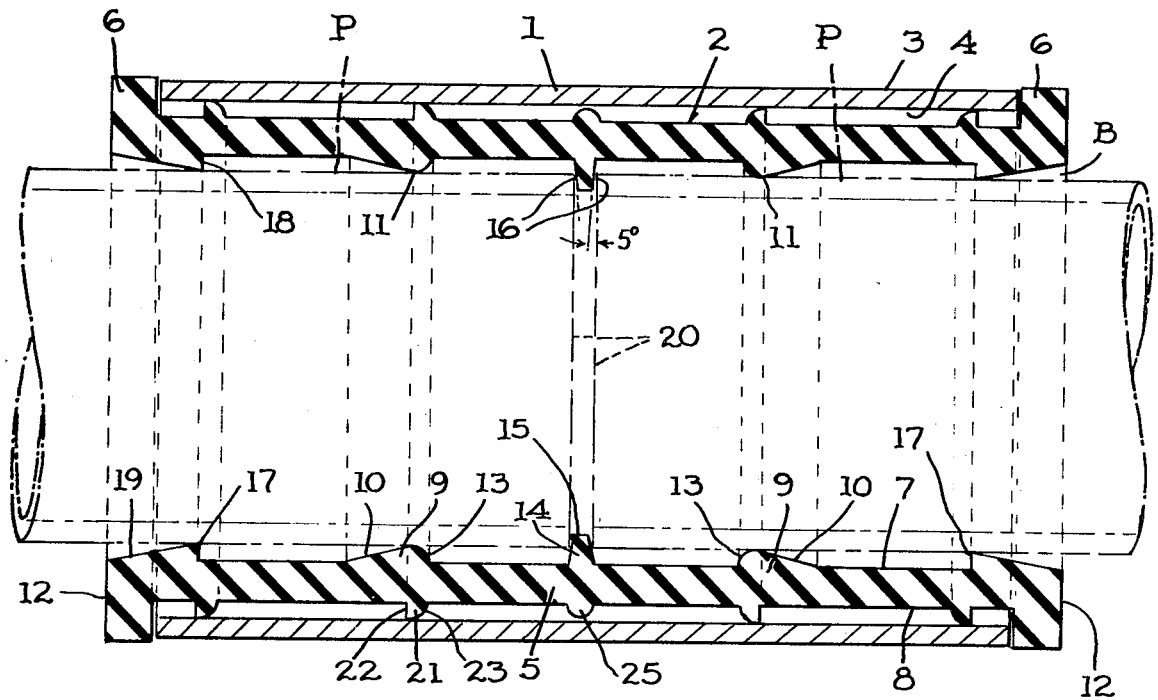
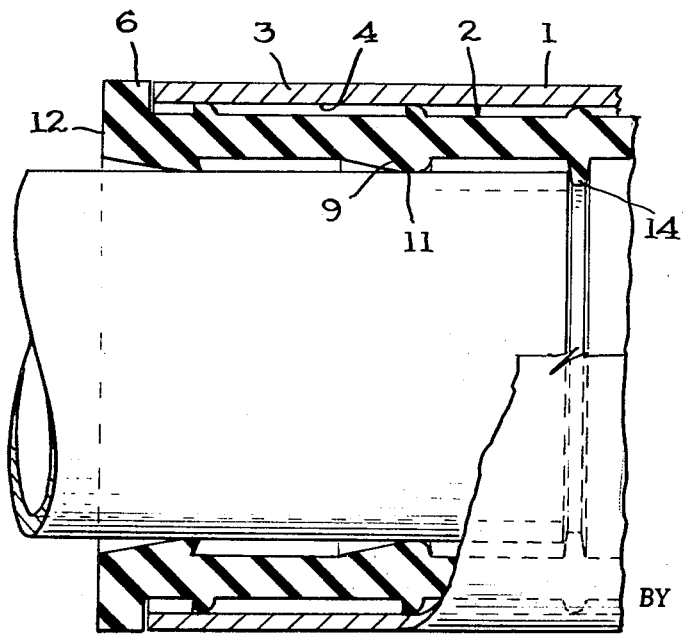
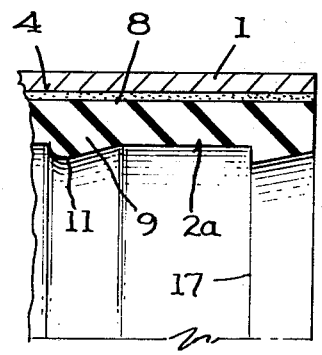

ns and special tools were often
PIPE JOINT

This invention relates generally to pipe joints and more particularly to a hubless joint of the compression type adapted to connect the free end portions of two axially aligned pipe end sections.

The very simplicity of the present device lends itself to economical manufacture as well as ease of subsequent utilization, inasmuch as the present joint comprises only two components but which are arranged in a manner to provide coupling engagement of two hubless pipes without a clamp. Many compression-type pipe joints have been provided in the past. However, in most cases, it has been necessary to combine a plurality of intricate components and special tools were often necessary in order to apply the joint. The present invention readily lends itself for use in connecting drainage pipes such as appear in sub-soil installations and are especially useful in situations wherein gravity flow under ambient pressure conditions is relied upon in the pipe system as opposed to positive pressure pipe systems.

Accordingly, one of the primary objects of the present invention is to provide an improved pipe joint comprising a double hubless compression assembly which requires no tools for the joining of two pipe end sections.

A further object of the present invention is to provide a compression joint assembly including a rigid retaining sleeve having a unitary resilient sleeve gasket concentrically mounted inside the sleeve and adapted to receive the end portions of two pipe sections.

Still another object of the present invention is to provide a two-part pipe joint including an inner resilient gasket having internally projecting ridges serving to yieldingly engage the outer periphery of a pair of pipe end sections as they are inserted from the outer limits of the joint and resisting reverse movement or withdrawal of the pipe sections.

A further object of the present invention is to provide an improved pipe joint including a resilient gasket restrained within a rigid sleeve and having a medially disposed radial lip in the interior thereof serving to provide both a stop and sealing means for the end faces of two pipe sections disposed therein.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

FIG. 1 is a longitudinal sectional view of the pipe joint of the present invention as it will appear when joining the end sections of two pipes.

FIG. 2 is a side elevation, partly in section, of one-half of the pipe joint of the present invention and illustrates more clearly the partial deformation of the sealing and retaining ridges of the resilient gasket when a pipe end is inserted.

FIG. 3 is a partial sectional view and illustrates a modified form of the sleeve and gasket of the present invention.

Similar reference characters designate corresponding parts throughout the several figures of the drawing.

Referring now to the drawing, particularly FIG. 1, the present invention will be seen to comprise a double hubless pipe joint of the compression type and includes two components, namely an outermost retaining sleeve 1 and a resilient sleeve gasket 2 concentrically disposed within the rigid retaining sleeve. The rigid sleeve 1 is constructed of any suitable material which is non-deformable under circumstances of normal use, such as a steel collar or sleeve, while the innermost sleeve gasket 2 is formed of any suitable elastomeric composition, either natural or synthetic, which is normally self-sustaining in configuration but which is yieldable when external force is applied thereto.

The rigid sleeve 1 includes a cylindrical outer surface 3 and inner surface 4 and will be seen to encompass, in the embodiment of FIGS. 1 and 2, an axial dimension which is significantly less than the overall length of the sleeve gasket 2. The sleeve gasket 2 basically comprises a cylindrical elastomeric element and includes a main body section 5 of an axial extent no less than the overall length of the rigid sleeve 1. End portions 6 disposed at the two extremities of the main body section 5 axially extend beyond the corresponding ends of the rigid sleeve 1 and include radial flange portions projecting outwardly to a diameter which is preferably no less than the diameter of the outer surface 3 of the rigid sleeve 1 such that it will be seen that the rigid sleeve is permanently held captive within the confines of the two radial flange portions 6—6 of the resilient gasket 2.

The main body section 5 of the gasket includes cylindrical interior and exterior walls 7 and 8, respectively, and, as will be seen most clearly in FIG. 1, the interior wall 7 is of a diameter significantly greater than the outer diameter of the pipe end sections P for which the joint is designed, thereby defining an inner chamber C therebetween. The gasket exterior wall 8 is of a diameter substantially less than the inner surface 4 of the rigid sleeve 1 and thus provides an outer chamber C' therebetween. The interior wall 7 of the gasket is provided with a plurality of ridges or ribs 9 extending about the inner periphery of the gasket, with at least one such ridge provided in each half section of the pipe joint. Each interior ridge 9 includes an inclined face 10 which slopes from the innermost nose portion 11 of the ridge in a direction toward the end faces 12 of that half section of the pipe joint. The other side of each ridge 9 preferably comprises an angular face 13 curved in the direction of the medial portion of the pipe joint. Quite obviously, alternate geometric configurations may be selected for the ridges 9 such as semicircular or square sections and thus it will be understood that the invention is not limited to the specific arrangement described above. At the exact medial point of the joint, a radial lip 14 is provided on the resilient gasket 2 and projects inwardly to a point which is no less than the distance of the outside diameter of the pipe section P. The lip includes an inner periphery 15 which preferably defines a diameter intermediate the internal and external diameters of the pipe end sections. Additionally, the lip 14 is provided with two lateral walls 16 which taper inwardly a slight amount, such as 5°, from the gasket main body section 5 towards the lip inner periphery 15.

A sealing edge 17 is provided at each end of the gasket main body section 5 and is defined by a radial shoulder 18 and an inclined inner surface 19, it again being understood that the normal, or unstressed, diameter defined by this sealing edge 17 is slightly less than the outside diameters of the intended pipe sections p.

From the foregoing description, it will follow that upon the insertion of two pipe end sections P into the bore B of the pipe joint, the end faces 20 of each pipe section will be urged inwardly towards the medial lip 14 and, during this movement, the sealing edges 17, as well as the interior ridges 9, will be displaced radially and outwardly against the natural resilient force exerted by the gasket 2. The joint is completed when the end faces 20 of the two pipe sections P abut the opposite lateral walls 16—16 of the lip 14. It will thus be seen that the sealing edges 17 and interior ridges 9 will serve to provide a constant holding force retaining the pipe sections in position, while the radial lip 14 will provide not only a stop member for the pipe sections but also will serve as sealing means for the ends of the two pipe sections. Any tendency of the pipe sections to be displaced outwardly from the joint are resisted by the construction of both the sealing edges 17 and the interior ridges 9 since both of these elements are constructed in a manner to oppose outward movement of the pipe sections while encouraging inward movement thereof and a water and gas tight joint.

The cylindrical exterior wall 8 of the resilient gasket 2 is provided with a plurality of exterior ridges or ribs 21, with at least one such exterior rib being provided at a point diametrically opposed to each interior ridge 9. The overall cross sectional area of each exterior ridge 21 is less than that encompassed by each interior ridge 9, such that outward force applied to the gasket by radial pressure upon the nose 11 will tend to initially compress the exterior ridge 21 first. In this manner, it will be seen that a resilient backup means is provided serving as cushion means for the gasket 2 in the areas of the interior ridges 9, whereby all outward forces applied to the main body section 5 of the gasket are transmitted through the exterior ridges 21 which abut against the fixed inner surface 4 of the rigid sleeve.

As shown in FIG. 1, each exterior ridge 21 may comprise a radial face 22 directed towards the flange portion 6 of the gasket and an annular face 23 on the opposite side of the ridge. Alternatively, the exterior ridges may comprise semi-circular or otherwise shaped ribs as described hereinabove with respect to the interior ridges 9.

The medial portion of the gasket 2 includes a limit bead 25 radially projecting outwardly from the exterior wall 8 thereof and which extends to a diameter slightly less than the diameter of the retaining sleeve inner surface 4. This bead 25 serves as a stop element limiting the outward displacement of the central area of the gasket main body section 5 in order to preclude withdrawal of the lip 14 from between a pair of opposed end faces 20 should the assembled pipe joint be subjected to excessive handling or displacement which would otherwise separate the lip 14 from between the opposed pipe sections and thus break the seal therebetween.

In the modification illustrated in FIG. 3, the outer chamber C', exterior ridges 21 and limit bead 25 are dispensed with by the casting of the gasket 2a directly against the inner surface 4 of the rigid sleeve. This arrangement also obviates the necessity of providing the radial flanges 6 on the gasket inasmuch as the sleeve and gasket may be rigidly affixed to one another by any suitable means such as an adhesive layer (not shown).

Regardless of the embodiment of the pipe joint utilized, the present device may be readily assembled in the field with minimal difficulty. Initially, the combined gasket and sleeve is forced onto one end of a hubless pipe or the hubless side of a single hub pipe by an available means such as manual force, a hammer or length of lumber. Thereafter, conventional tools as used for assembling a compression joint may be employed. The sleeve and gasket then serves as a hub for joining to one end of a hubless pipe or the hubless end of a single hub pipe.

I claim:

1. A compression joint for two pipe ends including, a cylindrical rigid outer retaining sleeve having a substantially straight inner surface, a cylindrical resilient sleeve gasket concentrically disposed within said rigid sleeve, said gasket having an exterior wall provided with a plurality of outwardly extending ribs engaging said sleeve inner surface and defining an outer chamber between said gasket and sleeve encompassing the majority of the length of the joint both before and after insertion of the pipe ends, an interior wall on said gasket having a diameter substantially greater than the diameter of the pipe ends to be inserted into the joint and defining with the pipe ends an inner chamber encompassing the majority of the length of the joint, a plurality of holding elements normally projecting inwardly from said gasket interior wall a distance defining a diameter less than that of the pipe ends, said gasket normally freely disposed within said sleeve and including means limiting axial displacement between said sleeve and gasket, said limiting means including end portions on said gasket of greater axial extent than said sleeve, a radial flange having a radius greater than the radius of said sleeve inner surface projecting outwardly from each said end portion to contain the ends of said sleeve, said inwardly projecting holding elements and outwardly extending ribs substantially radially aligned with one another on opposite sides of said gasket, and said holding elements each include a long inclined face extending from each gasket towards the center of the joint and intersecting a shorter angular face whereby, upon insertion of pipe ends from opposite ends of the joint, entry of the pipe ends is facilitated as said holding elements and their respective ribs are outwardly compressed and a retarding force is applied to resist withdrawal of the pipe ends from the joint.

* * * * *